(12) United States Patent
Luria

(10) Patent No.: US 6,663,043 B1
(45) Date of Patent: Dec. 16, 2003

(54) CONTAINER LIFTING APPARATUS PARTICULARLY USEFUL IN AIRCRAFT FOR STORING AND RETRIEVING GALLEY ARTICLES IN THE CARGO HOLD

(75) Inventor: David Luria, Tel Aviv (IL)

(73) Assignee: Fuselage Engineering Services Ltd., Tel Aviv (IL)

( * ) Notice: Subject to any disclaimer, the term of this patent is extended or adjusted under 35 U.S.C. 154(b) by 0 days.

(21) Appl. No.: 10/238,620

(22) Filed: Sep. 11, 2002

(51) Int. Cl.[7] ................................................ B64C 1/20
(52) U.S. Cl. .................................. 244/118.1; 244/118.5
(58) Field of Search .......................... 244/118.1, 118.5, 244/118.6, 137.1, 137.2; 414/236, 237; 198/465.1, 465.2

(56) References Cited

U.S. PATENT DOCUMENTS

| | | | |
|---|---|---|---|
| 3,630,402 A | * 12/1971 | Young | 414/434 |
| 3,833,140 A | * 9/1974 | Young et al. | 414/626 |
| 5,074,496 A | * 12/1991 | Rezag et al. | 244/118.1 |
| 5,314,143 A | * 5/1994 | Luria | 244/118.1 |
| 5,322,244 A | * 6/1994 | Dallmann et al. | 244/118.5 |
| 5,496,000 A | * 3/1996 | Mueller | 244/118.1 |
| 5,735,487 A | * 4/1998 | Abild et al. | 244/129.5 |
| 6,059,229 A | 5/2000 | Luria | |
| 6,152,287 A | 11/2000 | Luria | |
| 6,340,136 B1 | 1/2002 | Luria | |

* cited by examiner

*Primary Examiner*—Michael J. Carone
*Assistant Examiner*—Daniel Matz
(74) *Attorney, Agent, or Firm*—G. E. Ehrlich (1995) Ltd.

(57) ABSTRACT

Apparatus particularly useful in aircraft for moving a container from a supporting surface on a lower level, e.g., cargo hold, to a higher level, e.g., passenger compartment, via a vertical lift shaft, includes: a lift member in the vertical lift shaft, a displaceable suspension member suspended from and below the lift member and displaceable in a horizontal direction from a normal position in precise alignment with the vertical lift shaft; and a spring urging the displaceable suspension member to its normal position. A guiding element having an inclined guiding surface is carried by the displaceable suspension member and is effective, when engaged by a container during the downward movement of the lift member, to displace the displaceable suspension member and thereby to load the spring, such that when the container is lifted off the supporting surface during the upward movement of the lift member, the spring moves the displaceable suspension member, and the container engaged thereby, into precise alignment with the vertical lift shaft.

30 Claims, 13 Drawing Sheets

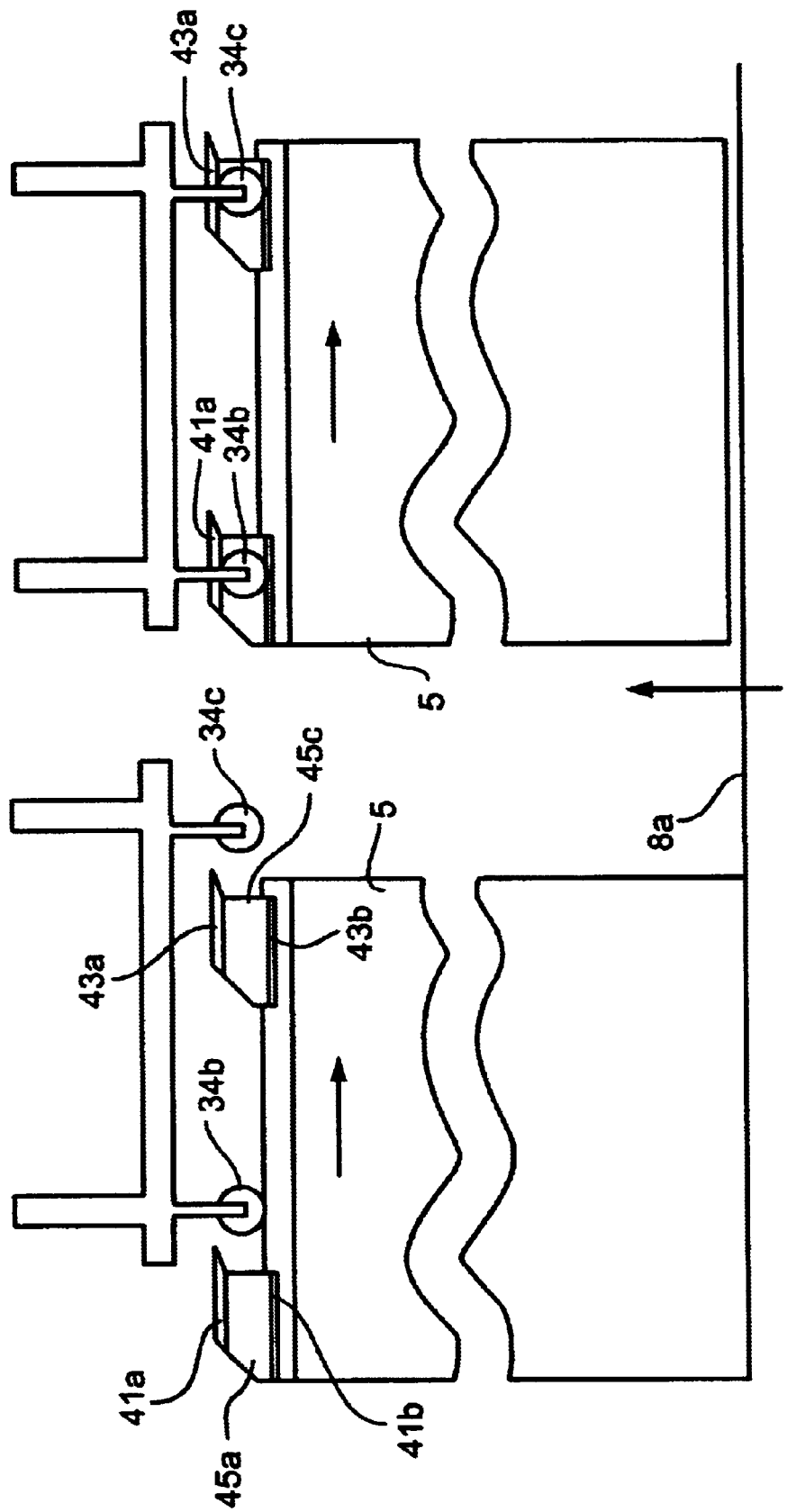

Fig. 12 RETRIEVING SELECTED CONTAINER

Fig. 13 RETURNING RETRIEVED CONTAINER

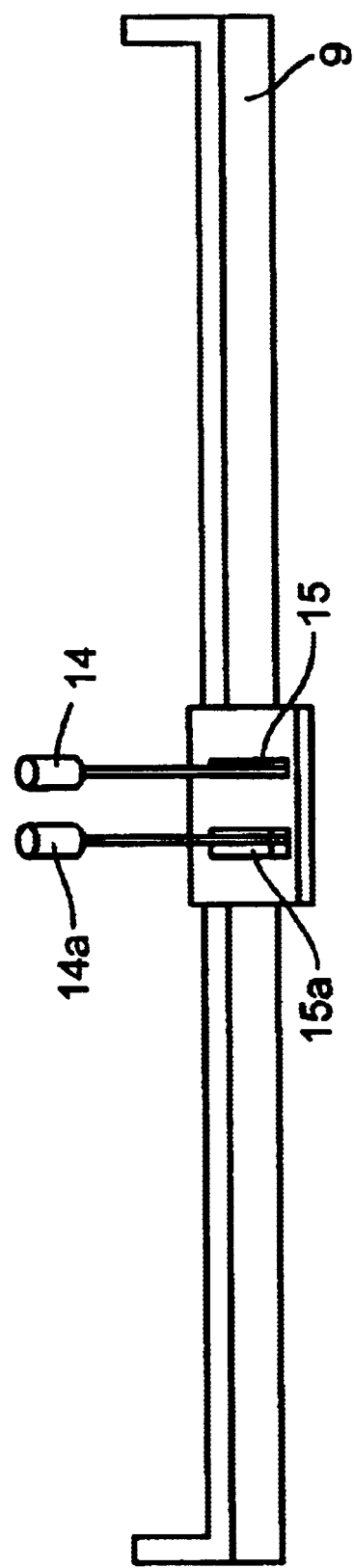

CONTAINER LIFTING APPARATUS PARTICULARLY USEFUL IN AIRCRAFT FOR STORING AND RETRIEVING GALLEY ARTICLES IN THE CARGO HOLD

FIELD AND BACKGROUND OF THE INVENTION

The present invention relates to lifting apparatus for lifting containers from a supporting surface on a lower level to a higher level via a vertical lift shaft. The invention is particularly useful in aircraft for storing galley articles within containers in the cargo hold and for retrieving such articles as and when desired. The invention is therefore described below with respect to such an application, but it will be appreciated that the invention could advantageously be used in many other applications.

The compact storing and retrieving of articles in general, and galley articles in particular, is a critical problem in aircraft design because of the need to maximize the utilization of space for passengers and/or cargo within the aircraft. My prior U.S. Pat. Nos. 6,059,229, 6,152,287 and 6,340,136 describe various arrangements for storing containers containing galley articles, such as wheeled carts and food trays, above the passenger compartment or below the passenger compartment, in a manner which permits such containers to be compactly stored, conveniently retrieved when desired, and then returned to their respective stored location. The present invention is particularly useful in such aircraft constructions wherein the containers containing the galley articles are stored in a cargo hold below the passenger compartment and are selectively lifted via a vertical lift shaft, installed in the main deck, into the passenger compartment. A plurality of the containers may thus be compactly supported on a supporting surface, e.g., in a standard size, in-flight container-holding system, and may be selectively shifted by a shifting mechanism to bring the container of a selected position on the supporting surface into precise alignment with the vertical lift shaft. The vertical lift shaft includes a lift member or platform which is movable upwardly to raise to the main deck a container selected to be retrieved, or downwardly to return the selected container to its respective position in the container-holding system in the cargo hold.

The possibility of misalignment of the lifting member, and/or the vertical lift shaft, with respect to the containers in the cargo hold is a serious problem in such aircraft during in-flight conditions because of the stress changes due to internal aircraft pressure variations. Such stress changes can produce misalignments between the containers in the cargo hold and the lift system, which can result in damage to, or even complete failure of, the container retrieving and returning system.

OBJECTS AND BRIEF SUMMARY OF THE INVENTION

One object of the present invention is to provide lifting apparatus for lifting containers through a vertical lift shaft, which apparatus has a reduced sensitivity to misalignment of the containers with respect to the lift system and/or the vertical lift shaft. Another object of the invention is to provide a compact retrieving and returning apparatus for containers in aircraft which apparatus can accommodate, and compensate for, a relatively wide range of misalignments which may be caused by the in-flight or ground conditions of the aircraft.

According to one aspect of the present invention, there is provided lifting apparatus for lifting containers from a supporting surface on a lower level to a higher level via a vertical lift shaft, comprising: a lift member in the vertical lift shaft and movable upwardly and downwardly therethrough; a displaceable suspension member suspended from and below the lift member; the displaceable suspension member being displaceable in a horizontal direction with respect to the lift member, from a normal position in precise alignment with the vertical lift shaft, to a displaced position with respect to the lift member and vertical lift shaft; a spring loaded by the displacement of the displaceable suspension member when moved to its displaced position and urging, by the inherent elasticity of the spring the displaceable suspension to the normal position; and a guiding element carried by the displaceable suspension member; the guiding element having an inclined guiding surface effective, when engaged by a container during the downward movement of the lift member, to displace the displaceable suspension member in a horizontal direction with respect to the lift member and the vertical lift shaft, and thereby to load the spring; the arrangement being such that, when the lift member is lowered to engage a container on the supporting surface, the container engages the guiding surface of the guiding member to displace the displaceable suspension member horizontally and to load the spring; and when the container is lifted off the supporting surface during the upward movement of the lift member, the inherent elasticity of the spring returns the displaceable suspension member, and the container holder engaged thereby, to the normal position of the displaceable suspension member in alignment with the vertical lift shaft.

According to further features in the preferred embodiment of the invention described below, the displaceable suspension member carries a second guiding element having a second inclined surface located to be engaged by the container to be lifted, after traversing the first-mentioned guiding surface during the initial downward movement of the lift member.

According to still further features in the described preferred embodiment, the apparatus further comprises a drive for displacing the container in a second horizontal direction, orthogonal to the first horizontal direction, to effect the engagement of the container with the displaceable suspension member before the upward movement of the lift member for moving the container therewith through the vertical lift shaft. The engagement of the container with the displaceable suspension member before the upward movement of the lift member is effected by coupling elements carried by one receivable in coupling recesses in the other.

According to another aspect of the present invention, there is provided an aircraft comprising: a main deck dividing a section of the aircraft into a passenger compartment above the main deck, and a cargo hold below the main deck; a vertical lift shaft extending through the main deck into the cargo hold; a supporting surface in the cargo hold for supporting a plurality of containers in a plurality of positions; a shifting mechanism for shifting the plurality of containers to bring a container of a selected position on the supporting surface into precise alignment with the vertical lift shaft; a lift system including a lift member in the vertical lift shaft and movable upwardly and downwardly therethrough; a displaceable suspension member suspended from and below the lift member; the displaceable suspension member being displaceable in a horizontal direction with respect to the lift member, from a normal position in precise alignment with the vertical lift shaft, to a displaced position with respect to the lift member and vertical lift shaft; a spring loaded by the displacement of the displaceable suspension member when moved to its displaced position and urging, by the inherent elasticity of the spring the displaceable suspension to the normal position; and a guiding element carried by the displaceable suspension member; the guiding element having an inclined guiding surface effective, when engaged by one side of a container during the downward movement of the lift member, to displace the displaceable suspension member in a horizontal direction with respect to the lift member and the vertical lift shaft, and thereby to load the spring; the arrangement being such that, when the lift member is lowered to engage a container on the supporting surface, the container engages the guiding surface of the guiding member to displace the displaceable suspension member horizontally and to load the spring; and when the container is lifted off the supporting surface during the upward movement of the lift member, the inherent elasticity of the spring returns the displaceable suspension member, and the container engaged thereby, to the normal position of the displaceable suspension member in alignment with the vertical lift shaft.

According to yet another aspect of the present invention, there is provided a lift system comprising: a lift platform movable within a vertical lift shaft; a door movable from an open position to a closed position with respect to the vertical lift shaft; a door control system including a plurality of door sensors at different locations on the door for sensing the position of the door; a memory for storing a sequence of operation of the door sensors the door control system storing in the memory the sequence of operation of the door sensors during each door-closing operation; and a locking mechanism controlled by the door control system to lock the door closed, and to enable the lift system for operation only when the plurality of door sensors have been actuated according to the sequence of an immediately preceding door-closing operation as stored in the memory.

As will be described more particularly below, such container lifting apparatus can automatically accommodate a wide range of misalignments between the containers and the lift system vertical lift shaft. This makes the container lifting apparatus particularly useful for aircraft since it reduces the sensitivity of the system to misalignments in the aircraft structure caused by various stress conditions during in-flight operation of the aircraft. A further advantage is that the article lifting apparatus of the present invention is compatible with many different types of container storage, retrieval and returning systems, and generally requires little if any changes to accommodate different types of such systems.

Further features and advantages of the invention will be apparent from the description below.

BRIEF DESCRIPTION OF THE DRAWINGS

The invention is herein described, by way of example only, with reference to the accompanying drawings, wherein:

FIGS. 8a and 8b diagrammatically illustrate two stages in the engagement of the container of FIG. 6 by the displaceable suspension member carried by the lift platform;

FIG. 15 illustrates a modification in the sensor arrangement for sensing the Y-position (longitudinal position) of the container to be retrieved or returned.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

Further details of the construction and operation of storing and retrieving systems in which the novel lifting apparatus of the present invention may be used, are. described in the three above-cited U.S. Pat. Nos. 6,059,229, 6,152,287, and 6,340 136, the contents of which are incorporated herein by reference.

DESCRIPTION OF A PREFERRED EMBODIMENT

Overall Construction

Figure 1:
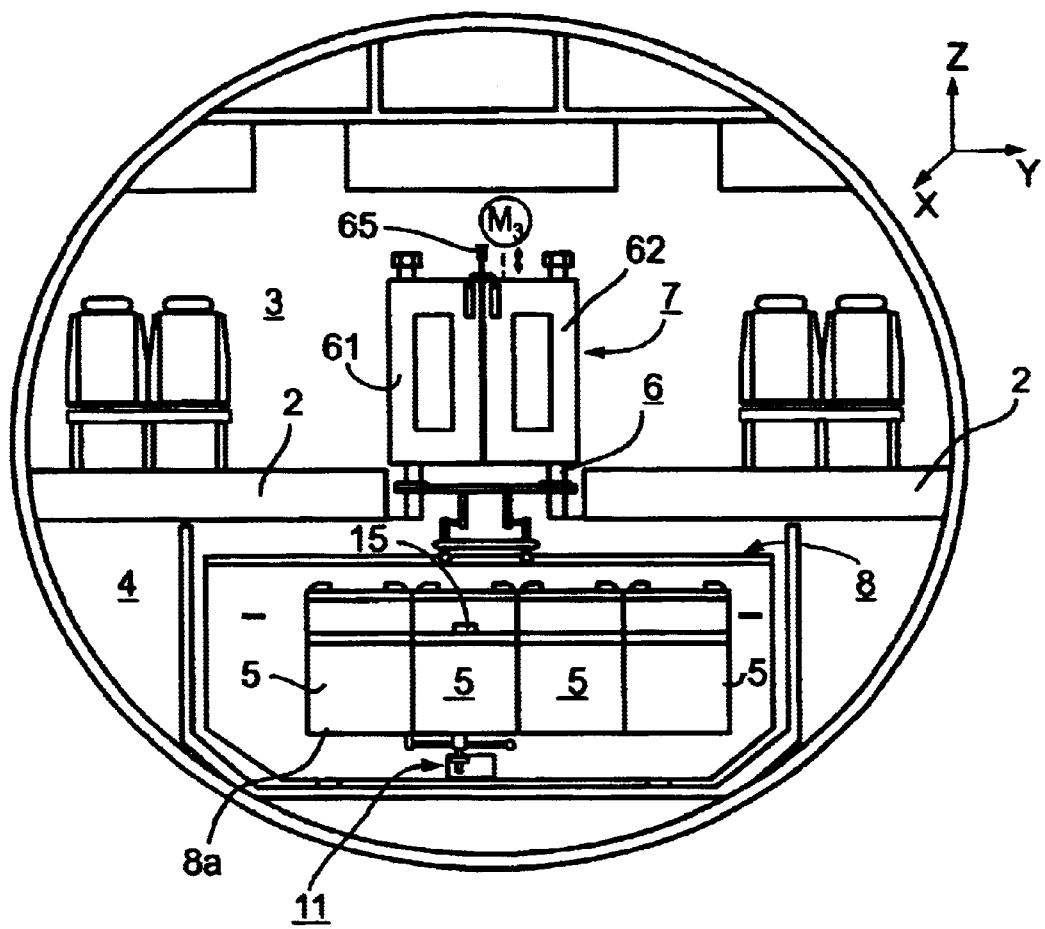
FIG. 1 is a side view of a container lifting apparatus constructed in accordance with the present invention as embodied in an aircraft for compactly storing containers in a lower cargo hold and for selectively lifting them into the passenger compartment of the aircraft and then returning them to the lower cargo hold.
Figure 2:
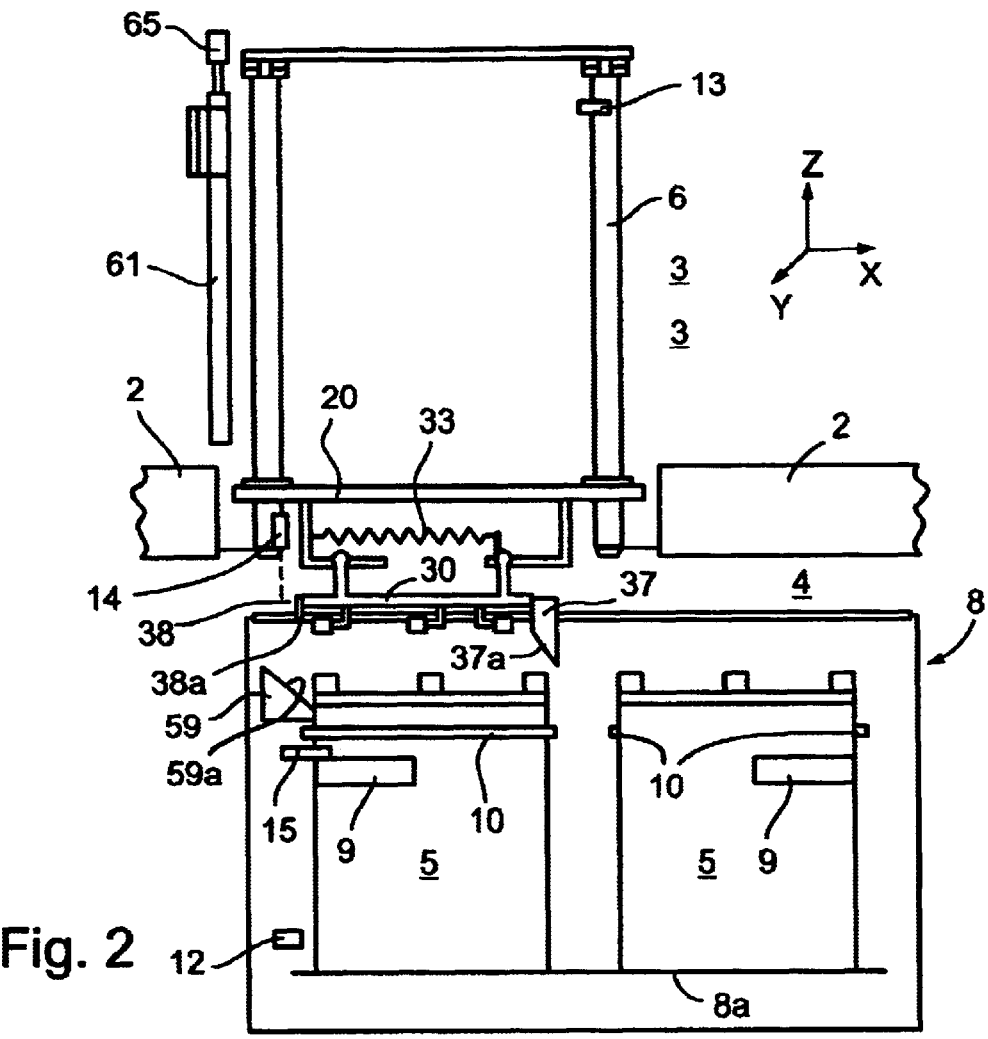
FIG. 2 is an end view of the apparatus of FIG. 1.

FIGS. 1 and 2 are side and end views, respectively, diagrammatically illustrating a section of an aircraft including a main deck 2 dividing the section of the aircraft into a passenger compartment 3 above the main deck, and a cargo hold 4 below the main deck. The cargo hold 4 stores a plurality of containers each designated 5, in a manner which is very compact to minimize the storage space, and which enables each container to be selectively retrieved by raising it through a vertical lift shift 6 into the passenger compartment 3, as desired, and to be returned to its precise position within the cargo hold 4 by a lift system generally designated 7.

The illustrated apparatus may be used with various types of containers 5, such as for holding standard wheeled carts or trolleys, for carrying food to be served or trash to be disposed, etc. Containers 5 are arranged within a standard-size, portable, container system, generally designated 8, in a two-dimensional matrix, including two longitudinally-extending columns and a plurality of transversely-extending rows of two containers in each row. The container system 8 is dimensioned so as to provide a vacant space for one container 5 in each of the two columns to permit shifting the containers on the container supporting surface 8a in order to align a selected one with respect to the vertical lift shaft 6 for lifting it through the shaft into the passenger compartment 3.

Figure 3:
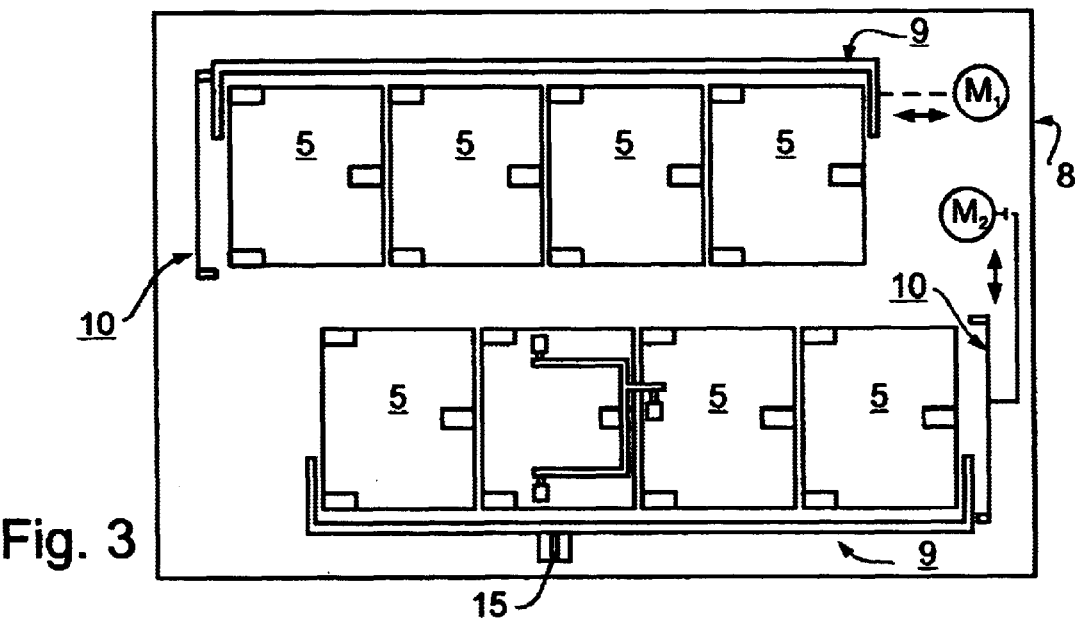
FIG. 3 is a top view of the cargo hold in FIG. 1 showing the manner of compactly storing and retrieving the containers therein.

FIG. 3 is a plan view illustrating the matrix of containers 5 in the standard-size, portable container system 8 within the lower cargo hold. In the example illustrated in FIGS. 1–3, the matrix is constituted of eight containers 5 arranged in a two-dimensional array of two columns, each including four containers, with an empty space (e.g., see FIG. 3) in each column to permit shifting the containers in order to align a selected one with respect to the vertical lift shaft 6. As shown in FIG. 3, the shifting of the containers is effected by a longitudinal shift mechanism, generally designated 9, driven by a motor $M_1$. The transverse shifting of the containers is effected by a transverse shifting mechanism 10 driven by a motor $M_2$. A third motor $M_3$ (FIG. 1) drives the lift system 7.

The manner in which the longitudinal shift mechanism 9 and transverse shift mechanism 10 shift the containers 5 on the supporting surface 8a of the container system 8 is more particularly described in the above-cited U.S. patents incorporated herein by reference.

Figure 9A:
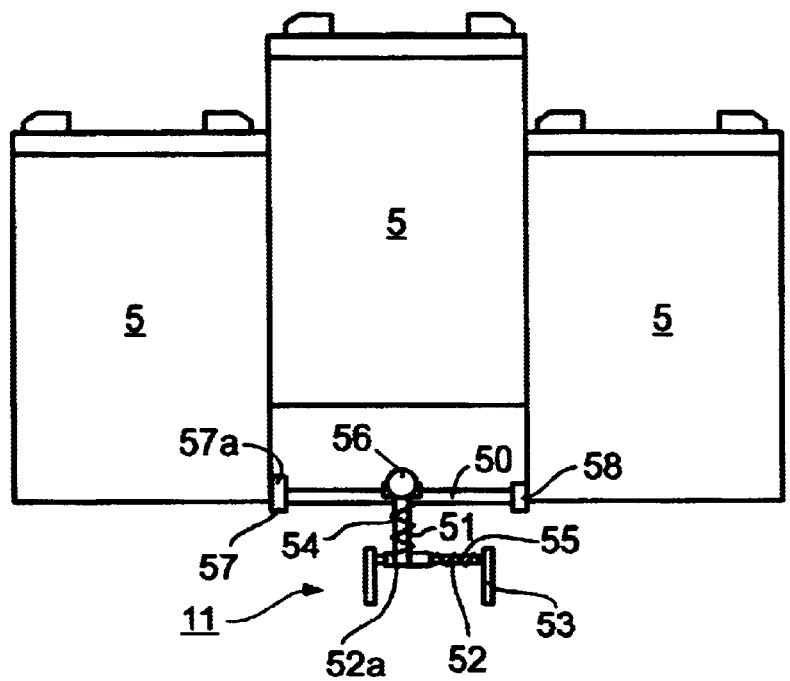
FIG. 9a illustrates a locking mechanism for locking the containers in a matrix against lateral movement when a container of the matrix is being retrieved.

As schematically shown in FIG. 1, the supporting surface 8a of container system 8 further includes a mechanical lock 11 which is actuated when a container 5 is lifted off the supporting surface 8a. Mechanical lock 11 secures the other containers 5 on the supporting surface 8a against movement in view of the vacant space produced by removing the selected container 5 from the matrix. The manner in which this is done is described below with respect to FIGS. 9a and 9b.

The illustrated apparatus further includes various position sensors. Thus, shown in FIG. 2 is a lower position sensor 12 for sensing a predetermined position of the lower end of a container 5 as it is being returned to its proper location in the matrix of the container system within the cargo hold. This predetermined position is at a known, precise, spacing above the final supporting surface 8a, e.g., 10 cm, so that when this position is sensed the lift system 7 can be operated a precise amount thereafter (e.g., a predetermined number of steps when member $M_3$ is a step motor) to precisely locate the container with respect to the supporting surface 8a.

The position sensors illustrated in FIG. 2 further include an upper position sensor 13 for sensing the upper position of the lift system 7, and a Y-position sensor 14 for sensing the longitudinal position of the matrix of containers 5. One side of the longitudinal shifting mechanism 9 is formed with a Y-location slot 15 (FIG. 3) which is sensed by the Y-position sensor 14 to precisely position the container 5 to be retrieved with respect to the lift system 7 and the vertical lift shaft 6.

Figure 10:
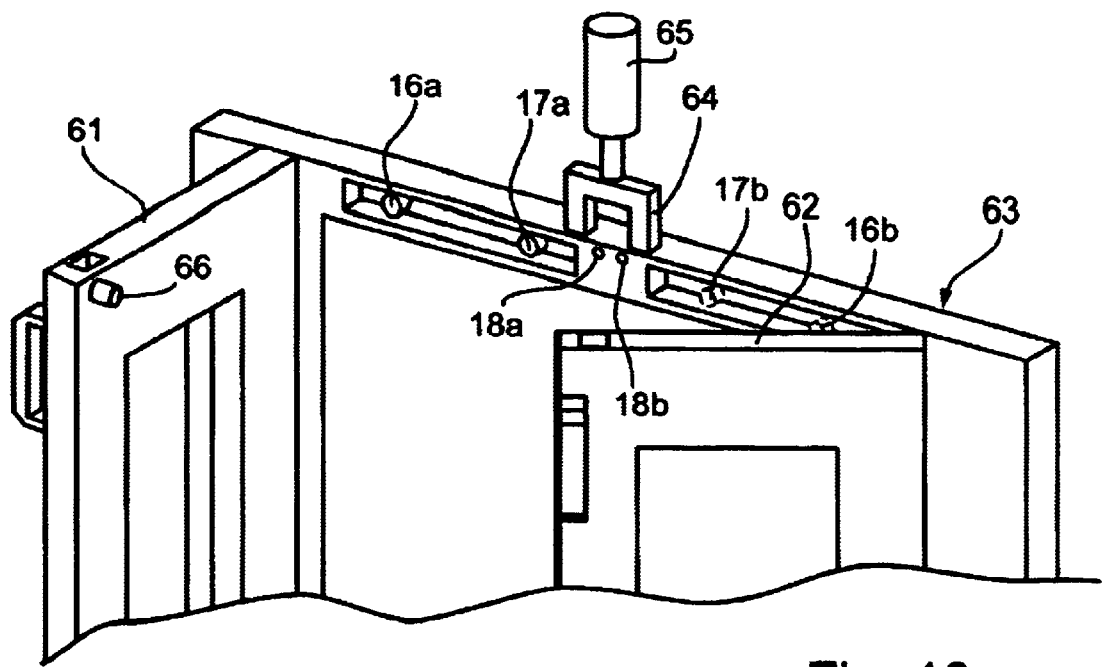
FIG. 10 illustrates an arrangement of sensors provided in the doors of the lifting apparatus to assure that the doors have been properly closed before allowing the lifting apparatus to be operated.

Other sensors, shown at 16a, 17a, 18a and 16b, 17b 18b, in FIG. 10 are provided on the doors of the lift system 7 of the passenger compartment 13, as described more particularly below with respect to FIGS. 10, 11 and 14.

The Lift System 7

Figure 4:
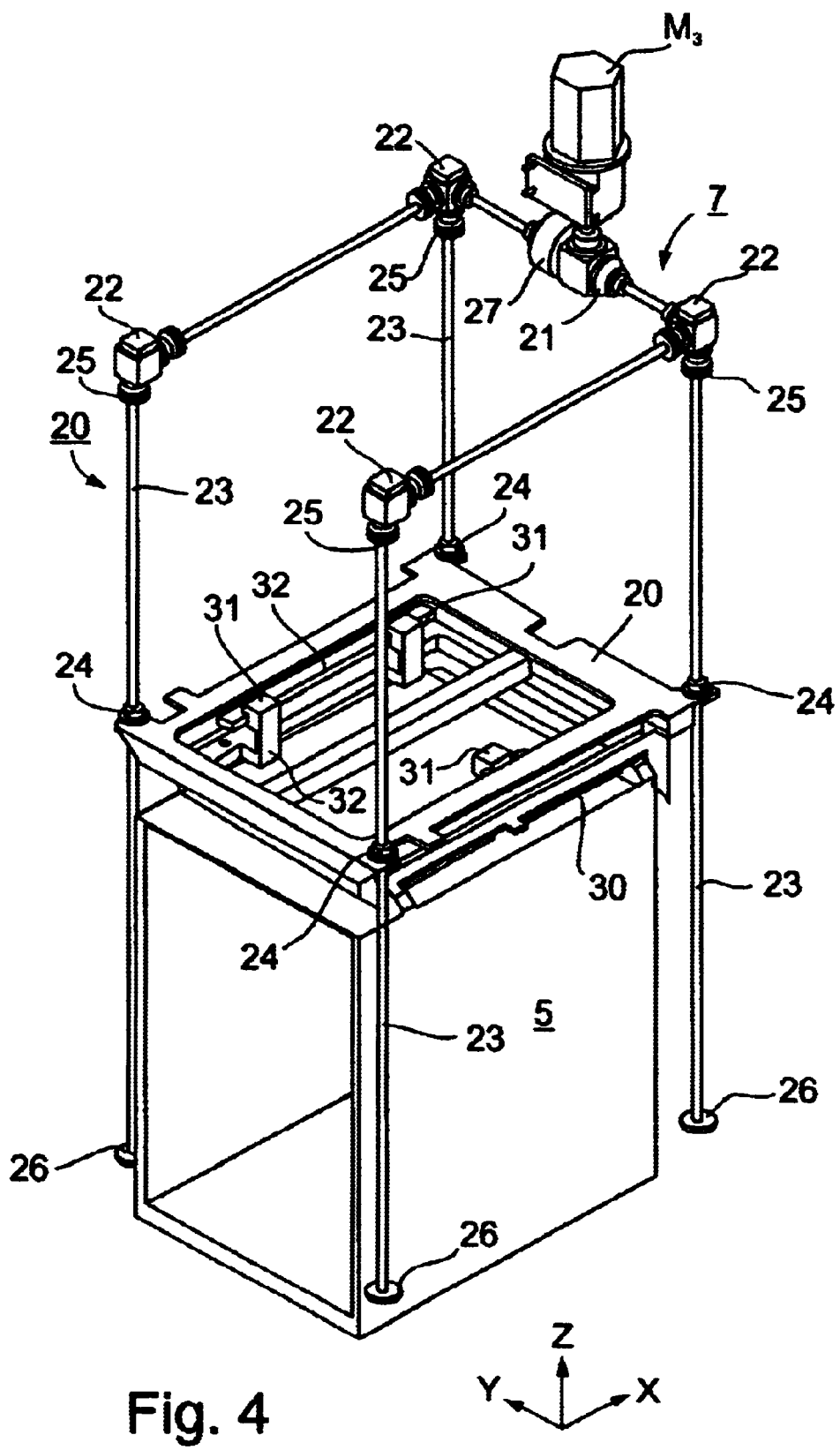
FIG. 4 is a three-dimensional view of the lift system engaging one of the containers for lifting it into the passenger compartment or for returning it to the lower cargo hold.

FIG. 4 more particularly illustrates the lift system 7 and one of the containers 5 attached thereto for lifting or lowering through the vertical lift shaft 6 (FIGS. 1, 2). As shown in FIG. 4, the drive motor $M_3$ for driving the lift is coupled to a lift member or platform 20 dimensioned according to the size and configuration of the vertical lift shaft 6 so as to be movable through it. Lift platform 20 is driven by motor $M_3$ via a gear box 21 coupled by four right-angle gear fittings 22 to drive four vertically-extending screws 23 extending through nuts 24 in the four corners of the lift platform 20. The four screws 23 are rotatably mounted on thrust bearings 25 carrying the load. The ends of screws 23 engage end bearings 26 which are fixed to the main deck 2 and which permit axial movement of the screws. The gear transmission is provided with an electrical emergency brake 27 adjacent to the gear box 21.

A displaceable suspension member 30 is suspended from and extends below the lift platform 20. Suspension member 30 is of the same rectangular configuration as, but of smaller dimensions than, the lift platform 20 and is displaceable thereon in one horizontal direction, namely along the long axis of the lift platform, shown as the X-axis in FIGS. 1 and 2. For this purpose. displaceable suspension member 30 is provided with three slide bearings 31 (FIG. 4). Two slide bearings 31 are received within a track 32 fixed on one side of the lift platform 20, and a third slide bearing is received within another track 32 on the opposite side of the lift platform. Suspension member 30 is thus displaceable along the axis parallel to the tracks 32, namely the X-axis shown in FIG. 2.

As further shown in FIG. 2, displaceable suspension member 30 is urged to its normal position by a spring 33. When displaceable suspension member 30 is in its normal position, to which it is urged by spring 33, it is precisely aligned with the lift platform 20 and the vertical lift shaft 6. As described below, spring 33 is used to precisely align the lift platform 20, and the container thereon, with the side entrance to the lift shaft within the passenger compartment when the container has been lifted thereto by the lift system.

Figure 5:
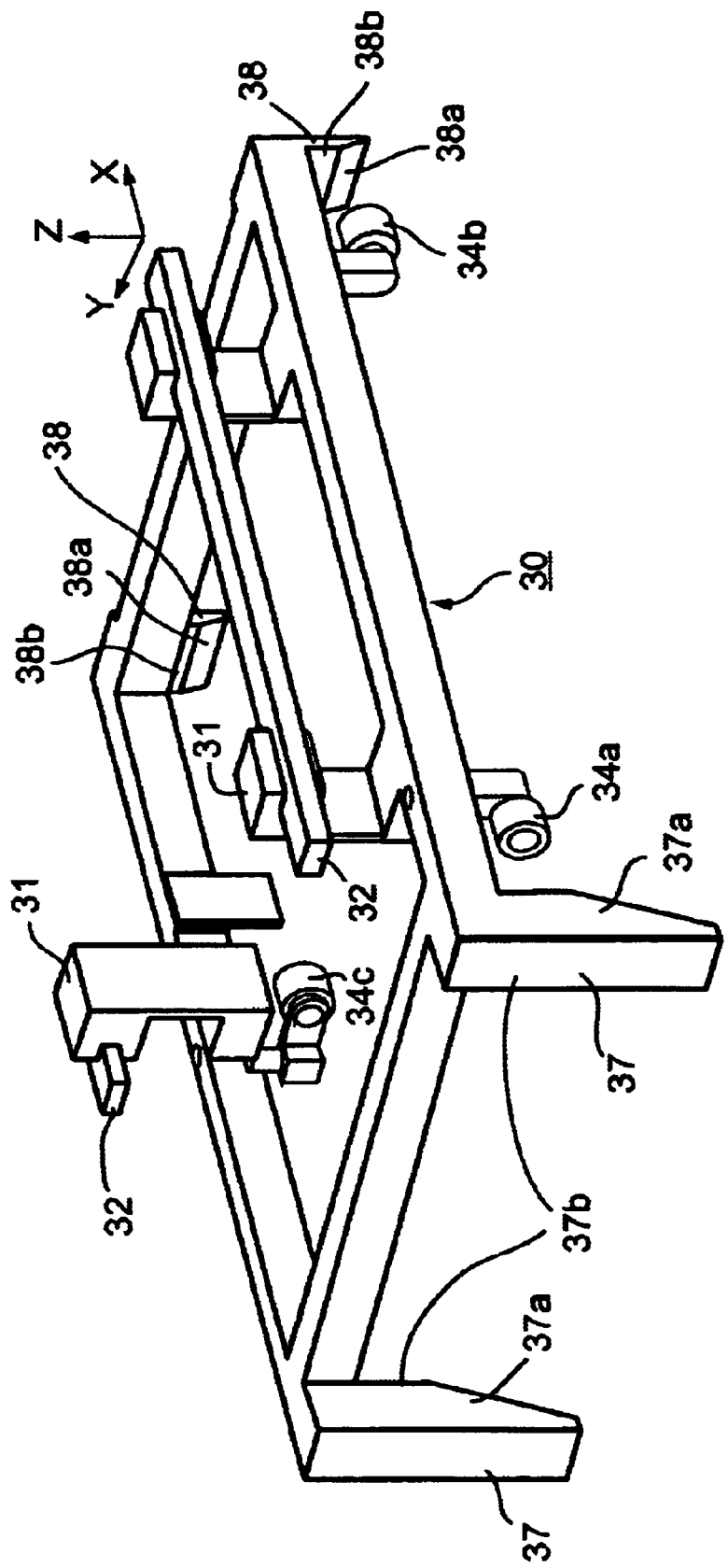
FIG. 5 is a perspective view of the displaceable suspension member suspended from and below the lift platform in the lift system.

Displaceable suspension member 30 is coupled to the container 5 to be lifted by a plurality of coupling elements carried by the suspension member receivable within coupling recesses in the upper surface of the container. As shown in FIG. 5, the coupling elements carried by the suspension member 30 are in the form of three pins or rollers, namely two rollers 34a and 34b at the opposite ends of one side of the suspension member, and a third roller 34c in the middle of the opposite side. Coupling rollers 34a–34c are adapted to be received within correspondingly located coupling recesses formed in the upper surface of each of the containers 5, as diagrammatically illustrated in FIGS. 8a, 8b, to be described below.

As further shown in FIG. 5, suspension member 30 is formed at one side with a pair of long guide members 37 having inwardly-facing, slanted guiding surfaces 37a and vertical guiding surfaces 37b. Suspension member 30 is formed at the opposite side with a pair of short guide members 38, also having inwardly-facing slanted guiding surfaces 38a, and vertical guiding surfaces 38b. The vertical height of guide member 38 is less than the height of vertical surface 37b. Guiding surfaces 37a, 37b serve as primary guiding surfaces and are vertically spaced below the suspension member 30, whereas guiding surfaces 38a, 38b serve as secondary guiding surfaces and are vertically located in the space between suspension member 30 and the primary guiding surfaces 37a.

As shown in FIG. 2, and as will be described more particularly below, when the lift platform 20 is to be used to retrieve a selected container 5 from the matrix of containers within the cargo hold 4, the suspension member 30 is lowered with the lift platform 20 to first cause its primary guiding surfaces 37a, 37b to engage one side of the selected container 5, which thereby displaces the displaceable member 30 coarsely (i.e., imprecisely) in one direction along the X-axis. Further lowered movement of the suspension member 30 causes its secondary inclined guiding surfaces 38a, and vertical surfaces 38b to engage the opposite side of the selected container 5 to thereby displace the displaceable member 30 finely (i.e., precisely) in the opposite direction along the X-axis. Such movements of the suspension member 30 loads the spring 33 such that, when the container is lifted off its supporting surface and raised by the lift system into the passenger compartment 3, spring 33 displaces suspension member 30, and the container held thereby, into precise alignment with the side entrance to vertical lift shaft 6 within the passenger compartment.

Figure 6:
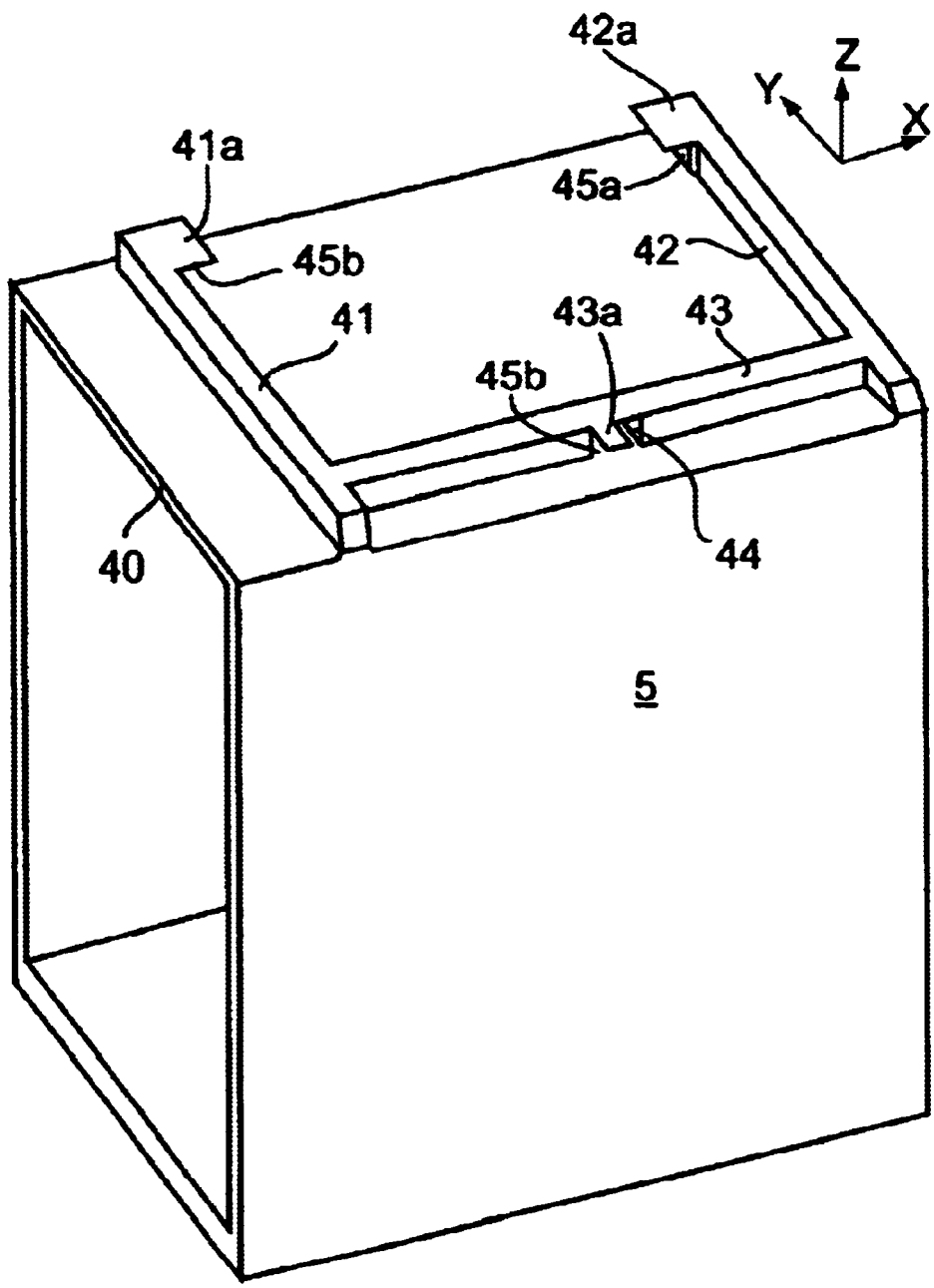
FIG. 6 is a three-dimensional view of the container to be retrieved, particularly illustrating the top structure to enable its engagement by the lift system.

As shown in FIG. 6, the upper wall 40 of each container 5 is formed with a pair of transversely-extending ribs 41, 42 connected by a longitudinally-extending rib 43. Rib 41 is spaced slightly inwardly from one end of container wall 40, whereas rib 42 is substantially flush with the opposite end of the container wall. Rib 43 is formed adjacent to one side of the container wall 40 and is spaced slightly inwardly of that side. Rib 43 is further formed with a central slot 44.

As further shown in FIG. 6, the two transversely-extending ribs 41, 42 are formed with inwardly-extending ledges 41a, 42a, at the side of the container 5 opposite to that containing the longitudinally-extending rib 43. Rib 43 is, in turn, formed with a similar ledge 43a at an intermediate portion overlying the slot 44. These three ledges 41a–43a define, with opposed ledges 41b–43b, respectively, three coupling recesses 45a–45c for receiving the coupling rollers 34a–34c, carried by the displaceable suspension member 30 suspended below the lift platform 20.

The inner surfaces of the three ledges 41a–43a are upwardly inclined in the outward direction. As will be described more particularly below with respect to FIGS. 8a, 8b, these inclined surfaces serve to guide the coupling rollers 34a–34c into their respective recesses when coupling the suspension member 30 to one of the containers 5 by effecting relative movement of container 5 along the Y-axis achieved by the action of the longitudinal shifting mechanism 9, (shown in FIG. 3). Such an arrangement permits the lift system 7, driven along the Z-axis, to terminate the downward drive of the lift platform 20 and its suspension member 30 such that the coupling rollers 34a–34c are slightly spaced upwardly along the Z-axis (as well as along the Y-axis) from their respective coupling recesses 45a–45c. This spacing along the Z-axis would be determined by the maximum tolerance of the container system and of the aircraft structure to distortion because of stress or other in-flight or ground condition. When relative movement is effected along the Y-axis, as described below, the inclined inner surfaces of the ledges 41a–43a guide the rollers into their precise positions within their respective coupling recesses within a wide range of distortion tolerances.

As briefly described above with respect to FIG. 2, automatic self-alignment along the X-axis is effected by the displaceable suspension member 30 which is displaceable along the X-axis by the engagement of its guiding surfaces 37a, 38a, and spring 33. Inclined surfaces 37a are first-engaged, and then inclined surfaces 38a are engaged, by the edge of the container 5. As the selected container within the lift shaft approaches the level of the side entrance of the lift shaft within the passenger compartment, spring 33 displaces the container in the X-direction to align it with the side entrance.

Automatic self-alignment of the displaceable suspension member 30, and the container 5 carried thereby, along the Y-axis is automatically effected by the Y-position sensor 14. Sensor 14 senses the Y-location slot 15 when the longitudinal shifting mechanism 9 is actuated to effect the coupling of the coupling rollers 34a–34c, carried by the suspension member 30, with the coupling recesses 45a–45c, formed in the upper surface of the container 5.

When a container 5 is withdrawn from the matrix of containers in the container system 8, a locking system, generally designated 11 in FIG. 1, is made effective to engage the adjacent containers, and thereby to lock the remaining containers within the matrix against lateral movement. Locking system 11, as more particularly shown in FIGS. 9a and 9b, includes a locking bar 50 extending horizontally and of a dimension equal to the transverse dimension of each of the containers 5. Locking bar 50 is supported on a vertical stem 51. Stem 51 is in turn slideably supported by a bearing 52a on a horizontal rail 52 carried by a mounting structure 53 mounted within the container system 8. Locking bar 50 is urged vertically upwardly by a spring 54 around its stem 51, and is urged laterally by another spring 55 around rail 52 to allow adjustment in the Y-direction.

A roller 56 is carried centrally of the upper surface of locking bar 50, and a pair of guide members 57, 58 are carried at the opposite ends of the locking bar 50. The outwardly-facing surface of guide member 57 is formed with an inclined guiding surface 57a to engage the outer surface of the container on the left side of the container being withdrawn, and thereby to self-center locking bar 50 precisely within the space being vacated by the container being withdrawn. Locking bar 50 is normally urged leftwardly by spring 55 as shown in FIG. 9b.

It will be seen that as a container is being withdrawn, the bottom of the container being withdrawn disengages from ball 56 of locking bar 50, and thereby permits spring 54 to move the locking bar 50 upwardly to occupy the space being vacated. As locking bar 50 rises, its guiding surface 57a engages the outer surface of the respective container at the left side of the container being withdrawn, and thereby precisely aligns locking bar 50 with the space being vacated, the lateral movement of the locking bar 50 being permitted by spring 55. Accordingly, as a container is being withdrawn from the matrix, locking bar 50 immediately rises to occupy the space being vacated before it is actually vacated, and thereby to lock the two containers on the opposite sides of the container being withdrawn against lateral movement.

Figure 9B:
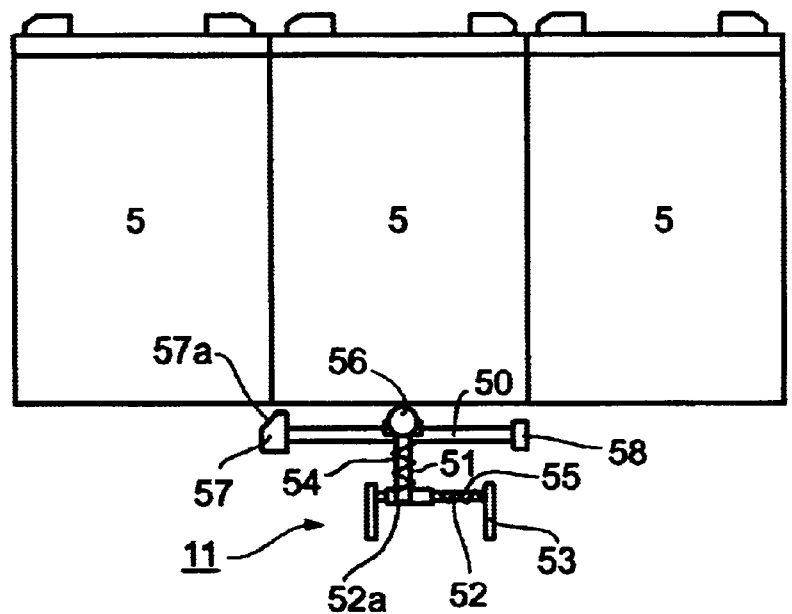
FIG. 9b illustrates the manner in which the return of the retrieved container back to its position in the matrix disables the locking mechanism.

As shown in FIG. 9b, when a withdrawn container is returned back to its position within the matrix, the bottom surface of the container being returned engages ball 56 to lower locking bar 50, permitted by spring 54, and thereby to disengage from the containers on the opposite sides of the container being returned, while spring 55 returns the locking bar to its normal lateral position shown in FIG. 9b. This permits the container being returned to fill its respective space in the matrix and thereby to allow lateral movement of all the containers in the matrix when moved by the shifting mechanism 9 and 10.

As shown in FIG. 2. the common container system 8 holding the matrix of containers 5 is provided with a further guiding element, generally designated 59, at the open top of the common container system. Guiding element 59 includes an inclined guiding surface 59a underlying the lift platform 20 and engageable by the lower edge of the container 5 when it is returned to the matrix of containers 5, to guide it into its allocated position with respect to the X-axis in the matrix of containers within the common container system 8.

As shown in FIG. 1, access to the vertical lift shaft 6 is provided by openable and closeable doors 61, 62 in the passenger compartment 3. As shown more particularly in FIG. 10, the two doors 61, 62 are pivotally mounted along one of their sides to a door frame structure 63 which carries a door lock 64 actuated by an actuator 65, such as a solenoid.

Door frame 63 further includes the previously-mentioned three door sensors 16a, 17a, 18a for door 61, and corresponding sensors 16b, 17b, 18b for door 62. The upper rear parts of the two doors 61, 62 are made of metal, and therefore the two sensors 16a, 17a and 16b, 17b for each door may be inductive sensors to sense the closed condition of their respective doors. Sensors 18a, 18b, however, are preferably key-operated electrical switch sensors, (e.g., disposed within recesses) to sense the presence of a projection (e.g., 66) on the inner face of each of the two doors 61, 62.

Figure 11:
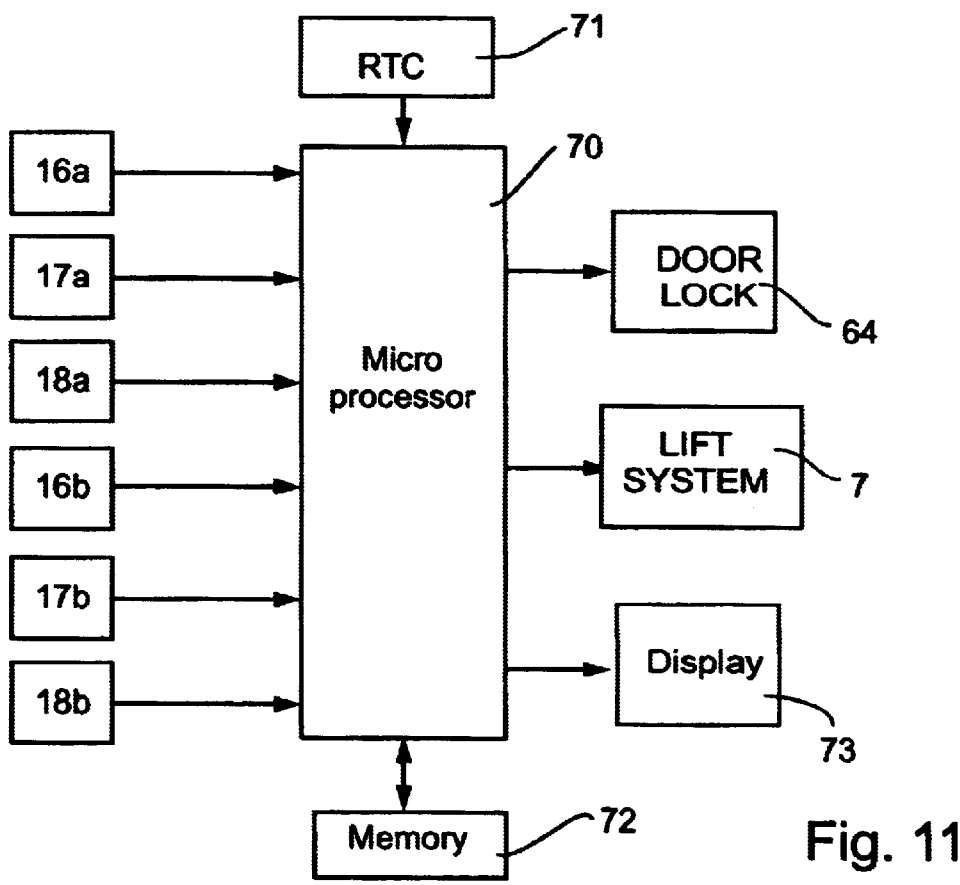
FIG. 11 is a block diagram illustrating the door control system for assuring that the doors have been properly closed before the lifting apparatus is allowed to be operated.

FIG. 11 is a block diagram illustrating the door control system controlled by the above-described door sensors 16a–18a and 16b–18b. The control system illustrated in FIG. 11 actuates the door lock 64 to mechanically lock the doors closed. The door control system also enables the lift system for operation only when all the door sensors have been actuated to their closed conditions, and only when they have been so actuated in the same sequence as in the immediately preceding door-closing operation, and within a predetermined time interval. As will be described more particularly below with respect to the flow chart of FIG. 14, such a control system permits the doors to be locked, and the lift system to be operated, even should their be some distortion in the doors 61, 62 with respect to their sensors in the door frame structure 63, and even should there be an attempt to manually over-ride the control system to permit operating the lift system when the doors have not been properly closed.

Thus, as shown in FIG. 11, the control system includes a microprocessor, generally designated 70, having inputs from the above door sensors 16a–18a, 16b–18b. Microprocessor 70 further includes, among the other components of such microprocessors, a real-time clock (RTC) 71 for measuring the time interval in a door-closing operation, and a memory 72 for storing the sequence of actuation of the door sensors on each side. As will be described more particularly below with respect to the flow chart of FIG. 14, the memory 72 stores the last sequence of actuation of the door sensors 16a–18a, 16b–18b and uses that sequence for determining whether the current door closing operation actuated the door sensors in the same sequence as in the immediately preceding door-closing operation. If the sequence of actuation of the door sensors does not match that of the immediately preceding sequence, or exceeds a predetermined time interval, the door lock 64 is not actuated; lift system 7 is retained disabled; the new sequence is stored in the memory; and a display 73 is energized informing the user to reopen and reclose the doors. When the doors are reclosed, the control system again checks to see whether the new sequence of sensor actuations during the door re-closing exactly matches the previous sequence stored in the memory, and also whether the sequence of sensor actuations was within a predetermined time interval. If so, the door lock 64 is actuated and the lift system 7 is enabled for operation.

As indicated earlier, the foregoing sequence of operation, as more particularly illustrated in the flow chart of FIG. 14 described below, prevents any attempt to override the door sensors, (e.g., by manual manipulation) while at the same time it enables operation of the lift system even should the doors, or the relative positions of the sensors on the door frames, become distorted by stresses in the aircraft structure or warping over a period of time.

OPERATION

The overall operation of the illustrated system involves the following three phases: (1) locating a selected container 5 of the matrix within container system 8 in the cargo hold 4 below the main deck for retrieval; (2) retrieving the selected container 5 by coupling it to the lift system 7 and lifting it through the vertical lift shaft 6 to the passenger compartment 3; and (3) returning a retrieved container 5 to its precise position within the matrix in the container system 8 in the cargo hold by lowering the lift system 7 back through the vertical lift shaft 6. The foregoing operations are described below, particularly with respect to the flow charts of FIGS. 12 and 13. In addition, the manner in which the operation of the lift system 8 is disabled, except when the door sensors have been actuated in the same sequence as in the immediately preceding door-closing operation, and within a predetermined time interval, is described below particularly with respect to the flow chart of FIG. 14.

As brought out earlier, the retrieving and returning stages are especially problematical in an aircraft because of possible misalignments between the lift system vertical lift shaft 6 with respect to the containers 5 in the container system 8 located in the cargo hold 4, resulting e.g., from the severe stress and temperature conditions of operation of the aircraft and/or variations in the location of the container system 8 in the cargo hold. Such misalignments may be along any of the three orthogonal axes, i.e., the horizontal X-axis (e.g., the direction of travel of the aircraft), the horizontal Y-axis, and the vertical Z-axis (the direction of travel of the lift system). All such misalignments are accommodated, within a wide predesigned range of tolerances, by the above-described apparatus in the manner more particularly described below.

Locating a Selected Container of the Matrix for Retrieval

FIGS. 1–3 illustrate a 4×2 matrix of containers 5 supported on the bottom supporting wall 8a of the container system 8. As indicated earlier, container system 8 would be dimensioned so as to define two vacant spaces for shifting the containers of the matrix in order to locate any desired container 5 with respect to the vertical lift shaft 6. The horizontal shifting system may be one of those described in the above-cited U.S. Pat. Nos. 6,059,229, 6,152,287 and 6,340,136 incorporated herein by reference. As described in those patents, such a horizontal shifting system includes a longitudinal shifting mechanism 9 driven by motor $M_1$ for shifting the containers along the Y-axis in FIGS. 1–3, and a transverse shifting mechanism 10 driven by motor $M_2$ for shifting the containers transversely along the X-axis of FIGS. 1–3. Since such horizontal shifting mechanisms do not form a part of the present invention, further details are not set forth herein but are available in the above-identified U.S. patents incorporated herein by reference.

Retrieving a Selected Container from the Matrix

Figure 12:
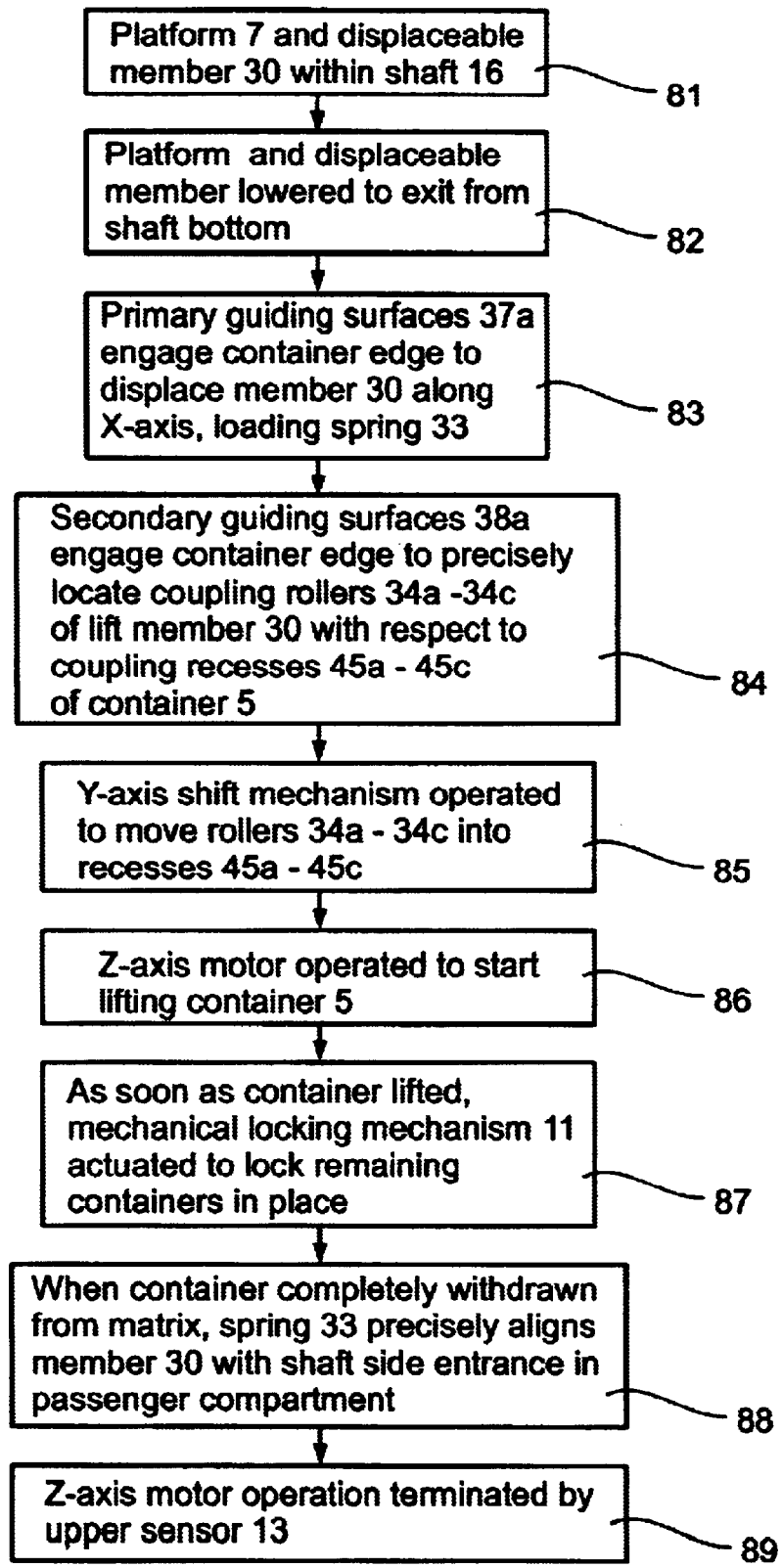
FIG. 12 is a flow chart illustrating a container retrieval operation wherein a selected container is raised from the cargo hold into the passenger compartment.

FIG. 12 is a flow chart illustrating the manner in which a selected container 5, in the matrix of containers in the container system 8, is retrieved from the matrix and lifted by the lift system 7 through the vertical lift shaft 6 into the passenger compartment 3.

The retrieval operation illustrated by the flow chart of FIG. 12 begins with the lift system 7, particularly the lift platform 20 and its displaceable suspension member 30, being in the condition shown in FIGS. 1 and 2 (block 81). In this condition as described earlier, the lift platform 20 is in a lower position within the vertical lift shaft 6: also, the matrix of containers 5 in the container system 8 within the cargo hold 4 has been shifted by the longitudinal shifting mechanism 9 and transverse shifting mechanism 10 to locate the selected container 5 in approximate alignment with the open end of the vertical lift shaft 6.

The lift system 7 is then actuated to lower both the lift platform 20 and its displaceable suspension member 30 to exit from the bottom of the vertical lift shaft 6 and to overlie the selected container 5 (block 82). As described earlier, because of the deformations in the aircraft structure, the lift system vertical shaft 6 may not be precisely aligned with the selected container 5, but may involve a misalignment along one or more of the three axes, namely the X-axis, the Y-axis and/or the Z-axis, as illustrated in FIGS. 1 and 2.

Figure 7:
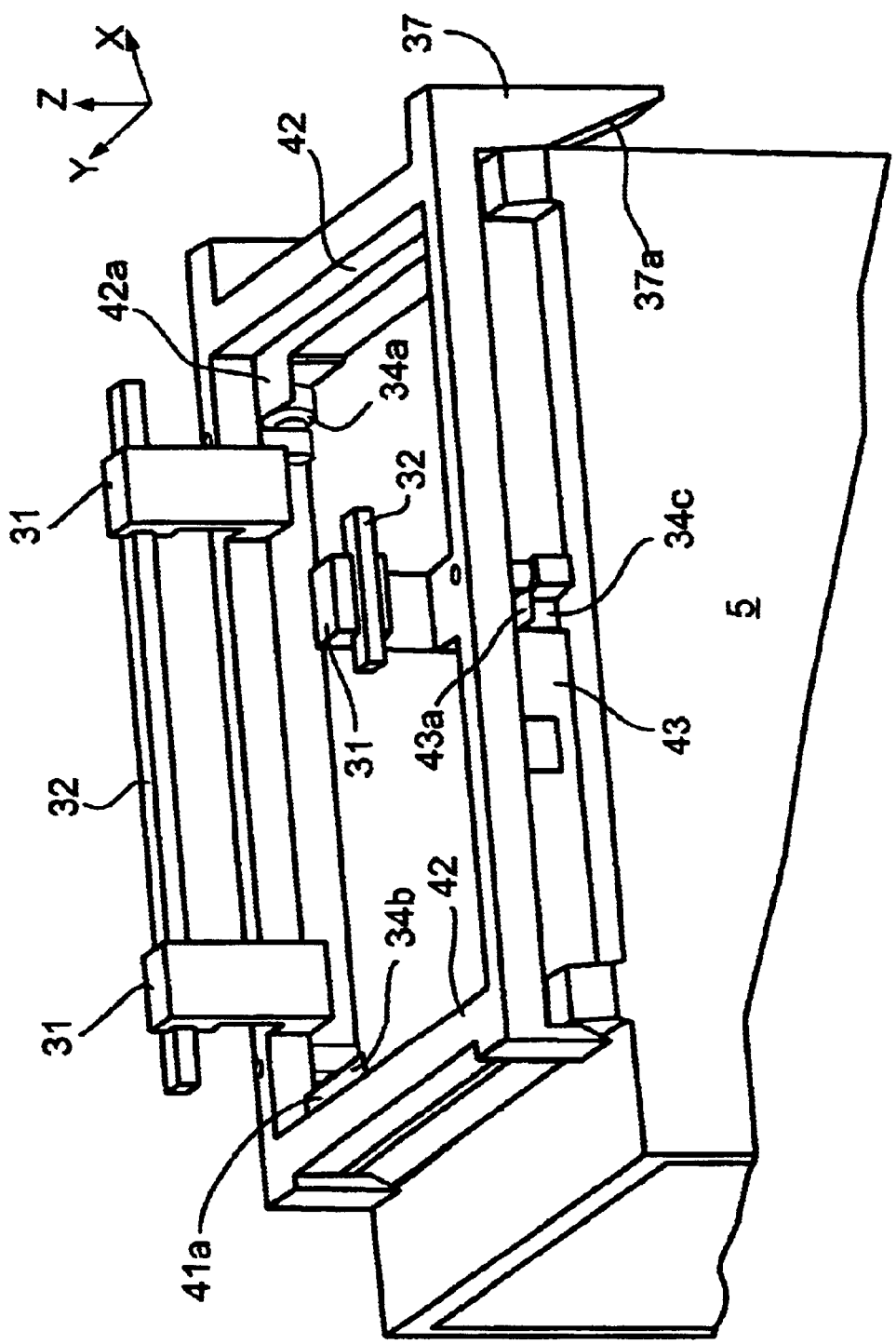
FIG. 7 is a three-dimensional view illustrating the engagement of the displaceable suspension member of FIG. 5 with the container of FIG. 6.

As the displaceable suspension member 30 is lowered towards engagement with the selected container 5, the primary (coarse) guiding surfaces 37a (e.g., FIG. 7) engage the upper edge of rib 42 in the upper surface of the selected container 5 and displace the suspension member 30 horizontally along the X-axis to load the spring 33 shown in FIG. 2 (block 83). After the primary guiding surfaces 37a of the suspension member 30 have been traversed by the upper edge of rib 42, the upper edge of rib 41 at the opposite end of the container 5 is engaged by the secondary (fine) guiding surfaces 38a, as shown in FIG. 2, and then with vertical surface 38b (FIG. 5). This produces a fine displacement of suspension member 30, together with container 5 suspended therefrom, and a fine loading of the spring 33, along the X-axis.

This displacement of the suspension member 30, first by the primary guiding surfaces 37a, 37b, and then by the secondary guiding surfaces 38a, 38b, also precisely locates the coupling rollers 34a–34c of the suspension member 30 with respect to the coupling recesses 45a–45c of the container 5 (block 84) along the Y-axis.

Motor $M_2$ of the Y-axis shifting mechanism 9 is then operated to move the matrix of containers 5 a short distance (-Y) along the Y-axis, determined by the Y-position sensor 14, fixed with respect to the vertical lift shaft 6 and thereby with respect to suspension member 30, sensing the Y-location slot 15 movable with the container 5 to be retrieved. This Y-axis movement is such as to move the coupling rollers 34a–34c of the suspension member 30 into the recesses 45a–45c of the container 5 (block 55). This operation thus self-aligns the selected container 5 with respect to the lift system 7 along the Y-axis.

As pointed out earlier, the inner surfaces of the ledges 41a, 42a, 43a (FIG. 7) in the upper surface of the container 5 are inclined in the outer direction sufficiently to engage the coupling rollers 34a–34c and to guide them into their respective coupling recesses 45a–45c (FIG. 6), for the maximum permissible misalignment of the lift system 7 with respect to the containers 5 in the Z-direction. This secures the selected container to the lift platform 20. Thus, when the lift platform is lowered to exit from the bottom of the shaft 6 (block 82), it brings the coupling rollers 34a–34c depending from the underside of its suspension member 30 in alignment with any point in the slanted undersurfaces of the ledges 41a–43a, such that when the longitudinal shifting mechanism 9 is operated to move the matrix of containers 5 along the Y-axis, the slanted undersurfaces of the ledges 41a–43a will engage coupling rollers 34a–34c, irrespective of the exact location of the coupling rollers (within the maximum tolerance limits), and guide the rollers into the coupling recesses 45a–45c (block 85) to secure the container to the lift platform.

The foregoing operation is more particularly illustrated in FIGS. 8a and 8b, wherein it will be seen that the rollers 34a–34c have been received within their respective recesses 45a–45c defined by the ledges 41a–43a and 41b–43b. When the rollers 34a–34c are thus received within their respective recesses, the container 5 held in suspension by the suspension member 30 of the lift platform 20 is firmly up-locked by ledges 41b–43b against vertical movement in the upward direction with respect to the lift platform even should a negative gravity condition occur in the aircraft at that particular instant.

After the lift system 7 has thus been coupled to the selected container 5 (by the engagement of the coupling rollers 34a–34c of the suspension member 30 within the coupling recesses 45a–45c of the container 5), the Z-axis motor $M_3$ is operated to start the lifting of the coupled container 5 from the matrix (block 86).

As soon as the container 5 being retrieved starts to rise, the mechanical lock 11 (FIG. 1) in the common container system 8 is actuated to engage the two containers on the opposite sides of the container being removed, and thereby to lock the remaining containers within the matrix in their matrix positions (block 87), as described above with respect to FIGS. 9a and 9b. This prevents any movement of the remaining containers of the matrix which might otherwise occur because of the vacant space produced by removing the selected container from the matrix.

As soon as the container has thus been lifted within the lift shaft and completely withdrawn from the matrix, spring 33 of the lift system 7, previously loaded by the displacement of the suspension member 30, returns by its inherent elasticity the suspension member to its normal position, wherein the container 5 suspended therefrom is moved horizontally towards, while in precise alignment with, the side entrance of the vertical lift shaft 6 within the passenger compartment (block 88).

The Z-axis motor $M_3$ continues to operate until the upper position sensor 13 (FIG. 2) is actuated which terminates its operation (block 89).

It will be thus seen that during the above-described operation for retrieving a selected container 5 from the matrix within the cargo hold 4, the apparatus automatically self-aligns the lift system moving through the vertical lift shaft with any misalignment of the lift system with the matrix of containers 5 along the X-axis, the Y-axis and the Z-axis. The apparatus also secures all the containers against free movement, even in the presence of a negative gravity condition.

Returning a Retrieved Container to the Matrix

When it is desired to return a retrieved container 5 from the passenger compartment 3 back to the container matrix in the container system 8 of the cargo hold 4, there may also be misalignments along the X-axis, Y-axis and/or Z-axis between the vertical lift shaft 6, through which the container is to be lowered, and the container system 8 in the cargo hold 4 to receive the container in its allocated position in the matrix. These possible misalignments are also accommodated by the described apparatus during the operation for returning a retrieved container to the container matrix, as illustrated in the flow chart of FIG. 13.

Figure 13:
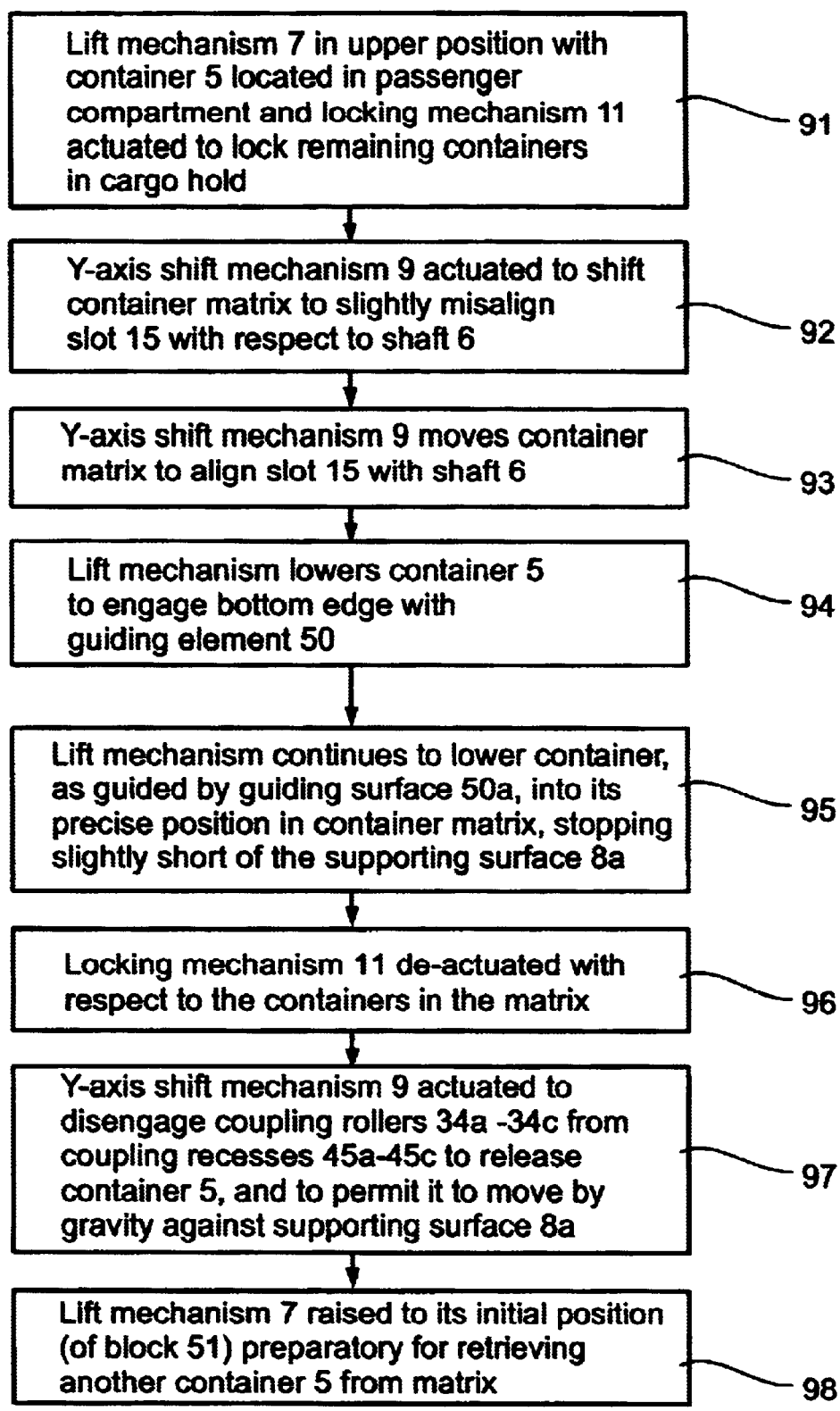
FIG. 13 is a flow chart illustrating a container return operation wherein the retrieved container is returned from the passenger compartment to its respective position in the cargo hold.

Block 91 in the flow chart of FIG. 13 represents the position of the apparatus at the end of the retrieving operation described above with respect to the flow chart of FIG. 12, and corresponds to the condition of the apparatus in block 89 of FIG. 12. In this condition of the apparatus, lift system 7 is in its upper position with container 5 located in the passenger compartment 3. It will also be recalled that the mechanical locking mechanism 11 in the container system 8 is in its actuated condition to lock the remaining containers 5 in place in the container system 8 in the cargo hold.

As indicated by block 92, the longitudinal shifting mechanism 9 is actuated by motor $M_1$ to shift the container matrix in the system 8 within the cargo hold 4 such as to bring the Y-location slot 15 slightly out of alignment with the vertical lift shaft 6. The longitudinal shifting mechanism 9 then moves the container matrix to precisely align the Y-location slot 15 (FIGS. 1 and 3) with the vertical lift shaft 6, as determined by the Y-position sensor 14 (FIG. 2) as indicated by block 93 in FIG. 13.

The lift system 7 is then actuated to lower container 5 to engage its bottom edge with guiding surface 59a of the guiding element 59 (block 94). As described earlier, guiding element 50 is fixed in the container system 8 within the cargo hold 4 in precise position (in the X-direction) of the container matrix from which the selected container was retrieved and to which the selected container is to be returned.

Lift system 7 continues to lower the container 5 to cause guiding surface 59a of the guiding element 59 to guide the container into its precise position (along the X-axis) in the container matrix (block 95). The lift system terminates the lowering of the container when the bottom of the container engages the bottom sensor 12 (FIG. 2), slightly raised from the supporting surface 8a (block 96). As described earlier, bottom sensor 12 is spaced a predetermined distance (e.g., 10 cm) above supporting surface 8a. When sensor 12 is actuated motor $M_3$ of the lift system 6 is operated a precise amount to locate the bottom of the container a short distance of the supporting surface (FIG. 8b). For example, if motor $M_3$ is a step motor it is actuated for a predetermined number of steps to precisely bring the bottom of the container 5 a centimeter or fraction thereof above the supporting surface 8a, permitting the container, when released, to move by gravity the remaining short distance to engage, without impacting, the supporting surface. Such an arrangement prevents the container from impacting the supporting surface 8a. It also prevent the rollers 34a–34c from impacting the top of container 5 during the engagement operation since such an impact could cause damage to the lift system, or to the container.

As the returned container is moved towards the supporting surface 8a, the mechanical locking mechanism 11 is de-actuated to release the mechanical lock with respect to the containers within the matrix (block 97) as shown in FIG. 9b. Also, the longitudinal shifting mechanism 9 is actuated to move the container matrix slightly along the Y-axis sufficient to disengage the coupling rollers 34a–34c of the lift system 7 from the coupling recesses 45a–45c of the container 5, thus releasing the container 5 from the lift system and permitting the container to move by gravity against the supporting surface 8a (block 98) as described above.

The lift system 7 is then raised to its initial position shown by block 81 (FIG. 12), preparatory for retrieving another container 5 from the matrix in the container system 8 within the cargo hold 4 whenever desired (block 99).

Door-Controlled Lift System Interlock

As indicated earlier, before the lift system 7 can be operated, the two doors 61, 62 must not only be closed, but also must have been closed in a manner which actuates the door sensors 16a–18a, 16b–18b (FIG. 10) in the same sequence as in the immediately preceding door-closing operation, and within a predetermined time interval. The system is thus protected not only against incomplete closing of the doors, but also against manual attempts to over-ride the door sensors in order to operate the lift system while the doors are in the open position. The door-controlled lift system interlock nevertheless permits operation of the lift system even should there be distortions or misalignments in the two doors with respect to the door frame structure, and/or the relative positions of the door sensors as may be caused by stress or other conditions during in-flight or ground operations.

Figure 14:
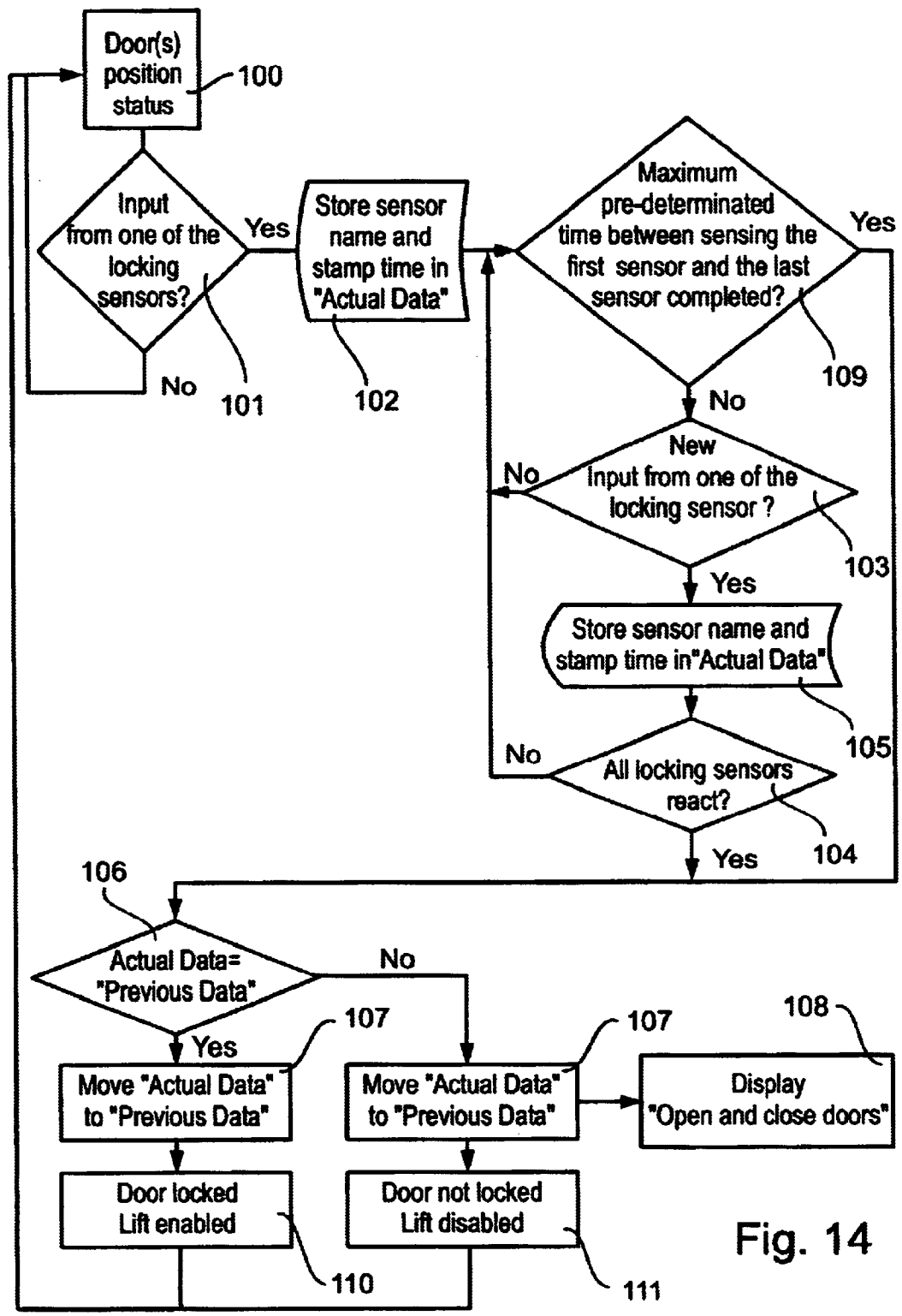
FIG. 14 is a flow chart illustrating the operation of the door sensor system to assure that the doors of the lifting apparatus have been properly closed before the lifting apparatus can be operated.

FIG. 14 is a flow chart illustrating the operation of the microprocessor 70 in FIG. 11 to perform this control function for each of the doors 61, 62 (FIG. 10).

Thus, as shown in the flow chart of FIG. 11 and FIG. 14, microprocessor 70 is continuously informed of the status of the door sensors 16a–18a, 16b–18b (FIG. 11 and block 100, FIG. 14). When the first sensor has been closed (block 101, FIG. 14), microprocessor 70 marks the time thereof (block 102), and then senses when the remaining sensors have been closed (blocks 103, 104), marking the time of closing of these sensors (block 105). The system then compares the sequence of operation of the door sensors with the sequence of the immediately preceding door closing operation (block 106). If the current sequence does not match the previous sequence, the system does not actuate the door lock 64, or enable the lift system for operation; rather, it stores the new sequence in its memory (block 107) and actuates a display which displays the message "Open and Close Door Again" (block 108). The newly stored sequence is thereafter used as the reference sequence to be compared with the next door closing operation.

If the current sequence does match the previous sequence, the system determines in each door whether the total elapsed time, from the actuation of the first door sensor to the actuation of the last door sensor, exceeded a predetermined time interval, e.g., 10 seconds (block 109). If the total elapse time was within the predetermined time interval in both doors, the system actuates the lock 64 (FIG. 10) to positively lock the doors (block 110), and also enables the lift system to operate.

On the other hand, if the current sequence did not match the previous sequence, or if the total elapsed time exceeded the predetermined time interval, the system again actuates the display "Open and Close Door Again" (block 108), without actuating the lock or enabling the lift system (block 111), and starts the process again (block 100).

Thus, if the user was unable to actuate the door lock 64 and thereby to enable the lift system 7, the user may again open and close the doors 61, 62 as instructed in the display, whereupon the system will again determine whether the actuation of the door sensors matched the previous sequence and also was completed during the predetermined time interval. Thus, if there was a deformation or misalignment in the doors, or its door frame structure, or in the relative positions of the door sensors, which prevented the actuation of the door lock and the enablement of the lift system in the previous attempt to close the doors, this will now be corrected in this next attempt to close the doors since the sequence of actuating the door sensors will now more likely match the sequence in the previous attempt to close the doors. If, however, the elapsed time interval exceeds the predetermined time interval, e.g., by an attempt to manually over-ride the interlock of the door sensors, then again the system will not actuate the door lock 64 or enable the lift system for operation.

Modification of FIG. 15

As noted above, the Y-position sensor 14 and the Y-location slot 15 are used to precisely align the container matrix system 8 in the cargo hold 4 with the vertical lift shaft 6 during both the container-retrieving operation and the container-returning operation. It may happen, however, that during either of such operations, a sudden movement of the container system 8 may occur (e.g., during rough weather conditions) such as to produce a sudden misalignment between sensor 14 and slot 15. This could cause damage to the lift and/or to the container.

FIG. 15 illustrates a modification to the Y-axis (longitudinal axis) shifting system driven by motor $M_2$ (FIG. 3) to accommodate the possibility of such a sudden misalignment. Thus, as shown in FIG. 15, the sensor system controlling motor $M_2$ includes a second sensor 14a, and a second Y-slot sensible element 15a. Sensor 14a is closely spaced to sensor 14, and Y-slot 15a is closely spaced to slot 15, both in the horizontal direction of the Y-axis shifting system driven by motor $M_2$. In addition, Y-slot 15a is elongated in the same horizontal direction.

The arrangement is such that when the container to be retrieved is precisely aligned along the Y-axis (longitudinal axis), sensor 14 is aligned with Y-slot 15, and sensor 14a is aligned with the right side of Y-slot 15a, as shown in FIG. 15. In such a case, the system would operate as described above both with respect to a container retrieval operation as well as with respect to a container returning operation.

However, if a sudden movement in the container system should occur as described above, such movement, and the direction of such movement, will be sensed by sensors 14, 14a, cooperating with the Y-slots 15, 15a, and will be corrected by the shifting mechanism.

Thus, if a sudden movement of the container system takes place to the right direction (FIG. 15), sensor 14 will no longer sense slot 15, whereas sensor 14a will continue sensing slot 15a. In this case, the control system will activate the Y-shifting mechanism 9 to move the container system to the left until both sensors sense the two slots. On the other hand, if the sudden movement of the container system 8 is in the left direction (of FIG. 15), both sensor 14 and 14a will not sense either of the slots 15, 15a. In this case, the control system will activate the Y-shifting mechanism 9 to move the container system to the right direction until both sensors again sense the respective slots.

The sensors 14, 14a and Y-slots 15, 15a function in a similar manner during a container-returning operation to accommodate any sudden movement that might occur during such a returning operation.

While the invention has been described with respect to one preferred embodiment, it will be appreciated that this is set forth merely for purposes of example, and that many other variations, modifications and applications of the invention may be made.

What is claimed is:

1. Lifting apparatus for lifting containers from a supporting surface on a lower level to a higher level via a vertical lift shaft, comprising:

a lift member in said vertical lift shaft and movable upwardly and downwardly therethrough;

a displaceable suspension member suspended from and below said lift member; said displaceable suspension member being displaceable in a horizontal direction with respect to said lift member, from a normal position in precise alignment with said vertical lift shaft, to a displaced position with respect to said lift member and vertical lift shaft;

a spring loaded by the displacement of said displaceable suspension member when moved to its displaced position and urging by the inherent elasticity of the spring, said displaceable suspension to said normal position;

and a guiding element carried by said displaceable suspension member; said guiding element having an inclined guiding surface effective, when engaged by a container during the downward movement of the lift member, to displace said displaceable suspension member in a horizontal direction with respect to the lift member and the vertical lift shaft, and thereby to load said spring;

the arrangement being such that, when the lift member is lowered to engage a container on the supporting surface, the container engages the guiding surface of the guiding member to displace the displaceable suspension member horizontally and to load said spring; and when the container is lifted off the supporting surface during the upward movement of the lift member, the inherent elasticity of said spring returns the displaceable suspension member, and the container holder engaged thereby, to said normal position of the displaceable suspension member in alignment with said vertical lift shaft.

2. The apparatus according to claim 1, wherein said displaceable suspension member carries a second guiding element having a second inclined surface located to be engaged by the container to be lifted, after traversing the first-mentioned guiding surface during the initial downward movement of the lift member.

3. The apparatus according to claim 1, wherein said apparatus further comprises a drive for displacing said container in a second horizontal direction, orthogonal to said first horizontal direction, to effect the engagement of said container with the displaceable suspension member before the upward movement of the lift member for moving the container therewith through the vertical lift shaft.

4. The apparatus according to claim 3, wherein said engagement of the container with the displaceable suspension member before said upward movement of the lift member is effected by coupling elements carried by one receivable in coupling recesses in the other.

5. The apparatus according to claim 4, wherein said coupling elements are carried by said displaceable suspension member, and said coupling recesses are carried by said container.

6. The apparatus according to claim 4, wherein said displaceable suspension member includes three of said coupling elements, and said container includes a coupling recess for each of said coupling elements.

7. The apparatus according to claim 4, wherein the leading edges of said coupling recesses are formed with inclined surfaces effective to engage said coupling elements of the displaceable suspension member and to guide them into said coupling recesses.

8. The apparatus according to claim 3, wherein said device for displacing said container in said second horizontal direction to effect the engagement of said container with said displaceable suspension member is controlled by at least one sensor fixed with respect to said displaceable suspension member cooperable with at least one sensible element movable with said container.

9. The apparatus according to claim 8, wherein said at least one sensor is fixed with respect to said vertical lift shaft, and said at least one sensible element is a slot formed in a member movable with said container.

10. The apparatus according to claim 8, wherein there are at least two of said sensors fixed in spaced relation to each other in said second horizontal direction, and at least two of said sensible elements in spaced relation to each other in said second horizontal direction; one of said sensible elements being elongated in said second horizontal direction to enable sensing any misalignment, and the direction of such misalignment, of the container with respect to the vertical lift shaft in said second horizontal direction.

11. The apparatus according to claim 1, wherein said apparatus comprises a further guiding element fixed at a predetermined location over said supporting surface and having an inclined surface effective to engage the displaceable supporting member and to guide it, and the container carried thereby, to a precise location with respect to said supporting surface during the downward movement of the lift member when returning a container to said supporting surface.

12. The apparatus according to claim 1, wherein said supporting surface at said lower level supports a plurality of said containers, all of the same external configuration, in the form of a two-dimensional matrix; said matrix of containers being shiftable longitudinally and transversely to align a selected container with respect to said vertical lift shaft for movement therethrough by said lift member, from the lower level to the higher level, and from the higher level to the lower level.

13. The apparatus according to claim 12, wherein said supporting surface includes a locking mechanism for locking all said containers against movement on said supporting surface upon removing a container from said matrix for lifting through said vertical lift shaft.

14. An aircraft comprising:
a main deck dividing a section of the aircraft into a passenger compartment above the main deck, and a cargo hold below the main deck;
a vertical lift shaft extending through said main deck into said cargo hold;
a supporting surface in said cargo hold for supporting a plurality of containers in a plurality of positions;
a shifting mechanism for shifting said plurality of containers to bring a container of a selected position on the supporting surface into precise alignment with said vertical lift shaft;
a lift system including a lift member in said vertical lift shaft and movable upwardly and downwardly therethrough;
a displaceable suspension member suspended from and below said lift member; said displaceable suspension member being displaceable in a horizontal direction with respect to said lift member, from a normal position in precise alignment with said vertical lift shaft, to a displaced position with respect to said lift member and vertical lift shaft;
a spring loaded by the displacement of said displaceable suspension member when moved to its displaced position and urging, by the inherent elasticity of the spring, said displaceable suspension to said normal position;
and a guiding element carried by said displaceable suspension member; said guiding element having an inclined guiding surface effective, when engaged by one side of a container during the downward movement of the lift member, to displace said displaceable suspension member in a horizontal direction with respect to the lift member and the vertical lift shaft, and thereby to load said spring;
the arrangement being such that, when the lift member is lowered to engage a container on the supporting surface, the container engages the guiding surface of the guiding member to displace the displaceable suspension member horizontally and to load said spring; and when the container is lifted off the supporting surface during the upward movement of the lift member, the inherent elasticity of said spring returns the displaceable suspension member, and the container engaged thereby, to said normal position of the displaceable suspension member in alignment with said vertical lift shaft.

15. The aircraft according to claim 14, wherein said displaceable suspension member carries a second guiding element having a second inclined surface located to be engaged by the container to be lifted, after traversing the first-mentioned guiding surface during the initial downward movement of the lift member.

16. The aircraft according to claim 14, wherein said apparatus further comprises a drive for displacing said container in a second horizontal direction, orthogonal to said first horizontal direction, to effect the engagement of said container with the displaceable suspension member before the upward movement of the lift member for moving the container therewith through the vertical lift shaft.

17. The aircraft according to claim 16, wherein said engagement of the container with the displaceable suspension member before said upward movement of the lift member is effected by coupling elements carried by one receivable in coupling recesses in the other.

18. The aircraft according to claim 16, wherein said coupling elements are carried by said displaceable suspension member, and said coupling recesses are in said container.

19. The aircraft according to claim 16, wherein said displaceable suspension member includes three of said coupling elements, and said container includes a coupling recess for each of said coupling elements.

20. The aircraft according to claim 16, wherein the leading edges of said coupling recesses are formed with inclined surfaces effective to engage said coupling elements of the displaceable suspension member and to guide them into said coupling recesses.

21. The aircraft according to claim 16, wherein said aircraft further comprises a further guiding element fixed over said supporting surface in alignment with said vertical lift shaft, said further guiding element having an inclined surface effective to engage the container carried by the displaceable supporting member and to guide it to a precise location with respect to said supporting surface during the downward movement of the lift member when returning a container to said supporting surface.

22. The aircraft according to claim 16, wherein said plurality of containers are arranged in a rectangular matrix, and said shifting mechanism includes longitudinal and transverse shifting devices for shifting said matrix of containers longitudinally and transversely with respect to said vertical lift shaft.

23. The aircraft according to claim 16, wherein said supporting surface, at said lower level supports a plurality of said containers, all of the same external configuration, in the form of a two-dimensional matrix; said apparatus including a shifting mechanism for shifting the matrix of containers longitudinally and transversely to align a selected container with respect to said vertical lift shaft for movement therethrough by said lift member, from the lower level to the higher level, and from the higher level to the lower level.

24. The aircraft according to claim 16,
wherein said shifting mechanism includes a first drive for driving said containers in said first horizontal direction, and a second drive for driving said containers in said second horizontal direction;
and wherein said apparatus includes a third drive for driving said lift member vertically through said vertical lift shaft.

25. The aircraft according to claim 16, wherein said lift system includes a door movable from an open position to a closed position with respect to an entrance opening to said vertical lift shaft; a door control system including a plurality of door sensors at different locations on the door for sensing the position of the door; and a locking mechanism controlled by said door control system to lock the door closed, and to enable the lift system, only when said plurality of door sensors have been actuated according to the sequence of an immediately preceding door-closing operation.

26. The aircraft according to claim 25, wherein said door control system locks the doors closed only when said plurality of door sensors are actuated according to said immediately-preceding sequence within a predetermined time interval.

27. The aircraft according to claim 25, wherein said plurality of door sensors includes at least three sensors.

28. A lift system comprising:
a lift platform movable within a vertical lift shaft;
a door movable from an open position to a closed position with respect to said vertical lift shaft;
a door control system including a plurality of door sensors at different locations on the door for sensing the position of the door;
a memory for storing a sequence of operations of the door sensors said door control system storing in said memory the sequence of operation of said door sensors during each door-closing operation;
and a locking mechanism controlled by said door control system to lock the door closed, and to enable the lift system for operation, only when said plurality of door sensors have been actuated according to the sequence of an immediately preceding door-closing operation as stored in said memory.

29. The lift system according to claim 28, wherein said door control system locks the doors closed only when said plurality of door sensors are actuated according to said preceding sequence within a predetermined time interval.

30. The lift system according to claim 28, wherein said plurality of door sensors includes at least three sensors.

* * * * *